March 29, 1955  L. T. SZADY  2,705,066
ONE-WAY CLUTCH
Filed Feb. 5, 1951
FIG.2.
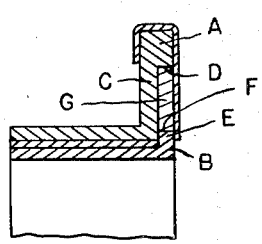
FIG.I.
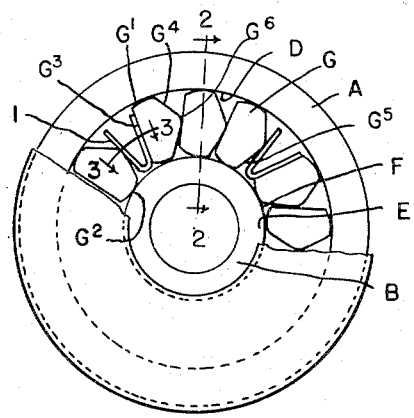
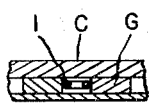
FIG.3.
INVENTOR.
LEOPOLD T. SZADY
BY
*Whittemore Hulbert & Belknap*
ATTORNEYS

United States Patent Office 2,705,066
Patented Mar. 29, 1955

2,705,066

ONE-WAY CLUTCH

Leopold T. Szady, Detroit, Mich., assignor to Formsprag Company, Van Dyke, Mich., a corporation of Michigan Application February 5, 1951, Serial No. 209,352

2 Claims. (Cl. 192—45.1)

The invention relates to one-way clutches of that type in which torque is transmitted in one direction of rotation through a series of sprags interposed between concentric raceways, respectively, on the driving and the driven members of the clutch.

It is the object of the invention to obtain a construction capable of transmitting light loads occupying relatively small space.

It is a further object to obtain a construction in which the sprags are formed from stampings of sheet material.

With these objects in view the invention consists in the construction as hereinafter set forth.

In the drawings:

Fig. 1 is a section through the clutch in the plane of rotation thereof;

Fig. 2 is a transverse section on line 2—2, Fig. 1; and

Fig. 3 is a section on line 3—3, Fig. 1.

Sprags as used in one-way clutches are usually formed of prismatic bodies having an axial length which is as long or longer than the radial dimension thereof. The length is determined by the number of sprags in the series and the load which each is designed to transmit. However, for certain uses the transmitted load is relatively light.

It is one of the objects of my invention to obtain a construction of sprag which can be formed as a stamping from sheet material, so that the axial length may be reduced to the minimum. This not only saves space but also greatly reduces the cost of manufacture. It is, however, necessary to energize the individual sprags so that they will automatically frictionally engage with the respective members when the rotation is in one direction. This I accomplish by a resilient member of a particular construction which is interposed between pairs of sprags at one or more points in the series. As illustrated A and B are relatively rotatable members having a common axis. C is a disk flange on the member A having its peripheral portion offset to form a raceway D. E has a disk flange on the member B, which is within the recess in the member C formed by the raceway D and with its periphery F forming a concentric inner raceway. Between the raceways D and F is arranged a series of sprags. Each sprag G is preferably formed with eccentric cam portions G' and G² for respectively contacting with the raceways D and F, also a generally radial side G³ and an opposite side which is formed by portions G⁴ and G⁵ which are at opposite acute angles to the side G³ and are centrally connected by a tangent arcuate nose portion G⁶. The angle between the side G³ and the inner opposite side portion G⁴ is sufficient to permit of arranging the series between raceways of relatively small radial dimensions and without interference between successive sprags in the series.

In assembling the parts the sprags may be placed in the recess between the race members D and F and then held in place by a cover member H which is secured to the member C. It is, however, necessary to provide means for energizing the sprags so that they will individually frictionally contact with the raceways when the rotation is in one direction. For this purpose I provide substantially V-shaped resilient members I which may be formed of wire, and which are interposed between adjacent sprags at one or more points in the series.

With the construction as described, if A is the driving member which is rotating clockwise, as illustrated in Fig. 1, this will transmit rotary movement from the raceway B through the sprags into the raceway F and thus to the member B. The resilient members I will transmit stresses successively through the intervening sprags, and due to the fact that the stresses transmitted through contact points on opposite sides of the sprag are not in alignment with each other a torque reaction will be developed in each sprag which will energize it to frictionally contact with the race members.

What I claim as my invention is:

1. A light duty one-way clutch comprising a pair of concentric tubular rotary members, one sleeved upon the other, each having at one end a radially projecting circular flange, said flanges being adjacent to each other and one extending radially beyond the other and having an axially projecting annular shoulder thereon spaced from and with its inner face concentric with the periphery of the other circular flange, sprags formed of relatively thin sheet stampings occupying the space between the latter flange and said annular shoulder, resilient energizing means between adjacent sprags biasing the same to frictionally contact with said flange and shoulder, and an annular disk cover peripherally engaging said outer flange and extending inward adjacent to said sprags to retain the latter in operative position.

2. The construction as in claim 1 in which each of said sprags has a V-shape nose portion projecting centrally from one side thereof and a straight substantially radial opposite side, and said energizing means is a V-shaped resilient wire between the nose portion of one sprag and the adjacent radial side of another sprag.

References Cited in the file of this patent

UNITED STATES PATENTS

| 1,694,377 | De Lavaud | Dec. 11, 1928 |
| 1,798,383 | Roberds | Mar. 31, 1931 |
| 2,079,527 | Rauen | May 4, 1937 |
| 2,245,431 | Critchfield | June 10, 1941 |
| 2,486,262 | Davis | Oct. 25, 1949 |
| 2,486,603 | King | Nov. 1, 1949 |
| 2,570,290 | Turner | Oct. 9, 1951 |